United States Patent
Redding et al.

(10) Patent No.: US 10,680,401 B2
(45) Date of Patent: Jun. 9, 2020

(54) SOURCES OF OPTICAL RADIATION AND METHODS FOR PROVIDING LOW-SPECKLE OPTICAL RADIATION, AND SYSTEMS AND METHODS USING THEM

(71) Applicants: Brandon Redding, New Haven, CT (US); Peyman Ahmadi, Manchester, CT (US); Martin Seifert, West Simsbury, CT (US); Hui Cao, New Haven, CT (US)

(72) Inventors: Brandon Redding, New Haven, CT (US); Peyman Ahmadi, Manchester, CT (US); Martin Seifert, West Simsbury, CT (US); Hui Cao, New Haven, CT (US)

(73) Assignees: Nufern, East Granby, CT (US); Yale University, New Haven, CT (US)

( * ) Notice: Subject to any disclaimer, the term of this patent is extended or adjusted under 35 U.S.C. 154(b) by 0 days.

(21) Appl. No.: 15/168,981

(22) Filed: May 31, 2016

(65) Prior Publication Data
US 2016/0352066 A1    Dec. 1, 2016

Related U.S. Application Data

(60) Provisional application No. 62/167,729, filed on May 28, 2015.

(51) Int. Cl.
*H01S 3/16* (2006.01)
*H01S 3/094* (2006.01)
(Continued)

(52) U.S. Cl.
CPC ...... *H01S 3/094007* (2013.01); *G01J 3/0218* (2013.01); *G01J 3/10* (2013.01);
(Continued)

(58) Field of Classification Search
CPC ........... H01S 3/094007; H01S 3/06729; H01S 3/1618; H01S 3/1603; H01S 3/0078;
(Continued)

(56) References Cited

U.S. PATENT DOCUMENTS 5,408,101 A * 4/1995 Wong ................. G01J 3/10
250/493.1
RE35,962 E * 11/1998 Ball ................. H01S 3/0675
372/102

(Continued)

*Primary Examiner* — Akm E Ullah
(74) *Attorney, Agent, or Firm* — McDonnell Boehnen Hulbert & Berghoff LLP

(57) ABSTRACT

The present disclosure relates more particularly to active optical fibers, amplified spontaneous emission (ASE) sources using such active optical fibers, and imaging and detection systems and methods using such ASE sources. In one aspect, the disclosure provides an active optical fiber that includes a rare earth-doped gain core configured to emit radiation at at least a peak wavelength emitted wavelength when pumped with pump radiation having a pump wavelength; a pump core surrounding the gain core; and a cladding surrounding the pump core, wherein the value $M=16R^2(NA)^2/\lambda^2$ in which R is the gain core radius, NA is the active optical fiber numerical aperture, and $\lambda$ is the peak emitted wavelength, is at least 50, or at least 100. The present disclosure also provides an optical source that includes the optical fiber coupled to a pump source.

26 Claims, 8 Drawing Sheets

(51) Int. Cl.

| | |
|---|---|
| *G02B 27/48* | (2006.01) |
| *G01B 11/14* | (2006.01) |
| *H01S 3/00* | (2006.01) |
| *G01J 3/02* | (2006.01) |
| *G02B 6/02* | (2006.01) |
| *G01S 17/00* | (2020.01) |
| *G01S 7/481* | (2006.01) |
| *G01S 7/4911* | (2020.01) |
| *G01J 3/10* | (2006.01) |
| *G01J 3/18* | (2006.01) |
| *H01S 3/067* | (2006.01) |

(52) U.S. Cl.
CPC ............ *G01J 3/108* (2013.01); *G01J 3/1895* (2013.01); *G01S 7/4818* (2013.01); *G01S 7/4911* (2013.01); *G01S 17/00* (2013.01); *H01S 3/0078* (2013.01); *H01S 3/06729* (2013.01); *H01S 3/1603* (2013.01); *H01S 3/1618* (2013.01); *G01B 11/14* (2013.01); *H01S 2301/02* (2013.01)

(58) Field of Classification Search
CPC .. H01S 2301/02; G01S 7/4818; G01S 7/4911; G01B 11/14; G02B 6/02; G02B 27/48; G02B 11/14; G01J 3/0218
USPC ........ 385/142, 147, 127; 359/341.34; 372/6, 372/37, 96, 102
See application file for complete search history.

(56) References Cited

U.S. PATENT DOCUMENTS

| | | | |
|---|---|---|---|
| 6,181,466 B1* | 1/2001 | Franzoso | G02B 6/2835 |
| | | | 359/341.3 |
| 7,102,812 B2* | 9/2006 | Diep | H04B 10/25253 |
| | | | 359/334 |
| 7,526,167 B1* | 4/2009 | Minelly | G02B 6/03633 |
| | | | 359/341.3 |
| 7,783,149 B2* | 8/2010 | Fini | G02B 6/02009 |
| | | | 372/6 |
| 7,983,312 B2* | 7/2011 | Shkunov | H01S 3/06704 |
| | | | 372/19 |
| 8,830,568 B2* | 9/2014 | Savage-Leuchs | ............ |
| | | | G02B 6/02009 |
| | | | 359/341.3 |
| 9,158,070 B2 | 10/2015 | Farmer | H01S 3/06754 |
| 9,681,917 B2* | 6/2017 | Neuberger | H01S 3/06745 |
| 10,050,404 B2 | 8/2018 | Farrow | H01S 3/0675 |
| 10,254,481 B2* | 4/2019 | Puckett | G02B 6/125 |
| 10,263,383 B2 | 4/2019 | Headley | H01S 3/06754 |
| 2004/0076197 A1* | 4/2004 | Clarkson | H01S 3/06708 |
| | | | 372/6 |
| 2008/0198894 A1* | 8/2008 | Matschullat | C21C 5/5211 |
| | | | 373/104 |
| 2008/0218732 A1* | 9/2008 | Mil'shtein | A61B 5/0059 |
| | | | 356/51 |
| 2010/0067860 A1* | 3/2010 | Ikeda | G02B 6/03633 |
| | | | 385/127 |
| 2015/0126982 A1* | 5/2015 | Neuberger | H01S 3/06733 |
| | | | 606/11 |
| 2018/0233875 A1* | 8/2018 | Jollivet | H01S 3/094007 |

* cited by examiner

SOURCES OF OPTICAL RADIATION AND METHODS FOR PROVIDING LOW-SPECKLE OPTICAL RADIATION, AND SYSTEMS AND METHODS USING THEM

CROSS-REFERENCE TO RELATED APPLICATIONS

This application claims the benefit of priority of U.S. Provisional Patent Application No. 62/167,729, which is hereby incorporated herein by reference in its entirety.

STATEMENT OF GOVERNMENT SUPPORT

This invention was made with government support under Grants Nos. 1R21EB016163-01A1 and 1R21HL125125-01A1 awarded by the National Institutes of Health (NIH). The government has certain rights in the invention.

BACKGROUND OF THE DISCLOSURE

1. Field of the Disclosure

The present disclosure relates generally to optical imaging systems. The present disclosure relates more particularly to active optical fibers, amplified spontaneous emission (ASE) sources using such active optical fibers, and imaging and detection systems and methods using such ASE sources.

2. Technical Background

Conventional amplified spontaneous emission (ASE) based light sources combine broadband emission, similar to a light emitting diode (LED), with high spatial coherence and high power per mode, similar to a laser. Examples include, for example, fiber-based ASE sources and semiconductor-based superluminescent diodes. See, e.g., P. Wang et al., "110 W double-ended ytterbium-doped fiber superfluorescent source with M2=1.6," *Opt. Lett* 31, 3116-3118 (2006); M. Rossetti et al., "Superluminescent light emitting diodes: the best out of two worlds," *Proc. SPIE* 8252, 825208 (2012). ASE sources have become increasingly popular for a range of applications including spectroscopy, optical coherence tomography (OCT), fiber sensors, and gyroscopes. See, e.g., W. Denzer et al., "Near-infrared broad-band cavity enhanced absorption spectroscopy using a superluminescent light emitting diode," *Analyst* 134, 2220-2223 (2009); A. F. Fercher et al., "Optical coherence tomography—principles and applications," *Reports Prog. Phys.* 66, 239-303 (2003); H. S. Choi et al., "High-performance fiber-optic temperature sensor using low-coherence interferometry," *Opt. Lett.* 22, 1814-1816 (1997); B. Lee et al., "Review of the present status of optical fiber sensors," *Opt. Fiber Technol.* 9, 57-79 (2003). However, the high spatial coherence of existing ASE sources has precluded their use in full-field imaging applications, where spatial coherence introduces undesirable artifacts such as speckle. By comparison, traditional low spatial coherence sources such as thermal sources and LEDs do not provide the required power per mode for high speed, full-field imaging applications. See B. Karamata et al., "Multiple scattering in optical coherence tomography. II. Experimental and theoretical investigation of cross talk in wide-field optical coherence tomography.," *J. Opt. Soc. Am. A.* 22, 1380-1388 (2005). Recently, there have been several demonstrations of multimode lasers which combine low spatial coherence with high power per mode, including dye-based random lasers, powder-based random Raman lasers, solid-state degenerate lasers, semiconductor-based chaotic microcavity lasers, and semiconductor-based large-area VCSELs and VCSEL arrays. See, e.g., B. Redding et al., "Speckle-free laser imaging using random laser illumination," *Nat. Photonics* 6, 355-359 (2012); A. Mermillod-Blondin et al., "Time-resolved microscopy with random lasers," *Opt. Lett.* 38, 4112-4115 (2013); B. H. Hokr et al., "A narrow-band speckle-free light source via random Raman lasing," *J. Mod. Optics,* 63, 46-49 (2015); M. Nixon et al., "Efficient method for controlling the spatial coherence of a laser.," *Opt. Lett.* 38, 3858-3861 (2013); R. Chriki et al., "Manipulating the spatial coherence of a laser source," *Opt. Express* 23, 12989-12997 (2015); B. Redding et al., "Low spatial coherence electrically pumped semiconductor laser for speckle-free full-field imaging," *Proc. Natl. Acad. Sci.* 112, 1304-1309 (2015); F. Riechert et al., "Speckle characteristics of a broad-area VCSEL in the incoherent emission regime," *Opt. Commun.* 281, 4424-4431 (2008); G. Craggs et al., "Thermally controlled onset of spatially incoherent emission in a broad-area vertical-cavity surface-emitting laser," *IEEE J. Sel. Top. Quantum Electron.* 15, 555-562 (2009); G. Verschaffelt et al., "Spatially resolved characterization of the coherence area in the incoherent emission regime of a broad-area vertical-cavity surface-emitting laser," *IEEE J. Quantum Electron.* 45, 249-255 (2009); J.-F. Seurin et al., "Progress in high-power high-efficiency VCSEL arrays," *Proc. SPIE* 7229, 722903 (2009). However, an optical fiber based light source with low spatial coherence has not been demonstrated. In addition, each of these previous demonstrations of low spatial coherence lasers provided narrow bandwidth emission with relatively high temporal coherence, precluding their use in ranging applications such as OCT or frequency resolved LiDAR. See, e.g., W. Drexler et al., *Optical Coherence Tomography* (Springer-Verlag, Berlin Heidelberg, 2008); W. C. Swann et al., "Frequency-resolved range/doppler coherent LIDAR with a femtosecond fiber laser," *Optics Letters* 31, 826-828 (2006).

SUMMARY OF THE DISCLOSURE

In certain aspects, the present disclosure relates to a fiber-based amplified spontaneous emission (ASE) source with low spatial coherence, low temporal coherence, and high power per mode. ASE can be produced by optically pumping a large gain core multimode fiber, for example while minimizing optical feedback to avoid lasing. In one particular embodiment, the fiber ASE source can provide 270 mW of continuous wave emission, centered at λ=1055 nm with a full-width half-maximum bandwidth of 74 nm. The emission can be distributed among as many as ~70 spatial modes, enabling efficient speckle suppression when combined with spectral compounding. The present disclosure also relates to the use of the fiber ASE source to provide speckle-free full field imaging. Accordingly, the fiber ASE sources described herein can provide a unique combination of high power per mode with both low spatial and low temporal coherence, making them attractive sources full-field imaging and ranging applications.

One aspect of the disclosure is an active optical fiber having a first end and a second end, the active optical fiber comprising
  a gain core, the gain core being configured to emit radiation at at least a peak wavelength emitted wavelength when pumped with pump radiation having a pump wavelength, the gain core being doped with a rare earth element, the gain core having a refractive index at the peak emitted wavelength;
  a pump core surrounding the gain core, the pump core having a refractive index at the peak emitted wavelength less than the refractive index of the gain core at the peak emitted wavelength, the pump core being configured to substantially confine radiation of the peak emitted wavelength within the gain core;

a cladding surrounding the pump core, the cladding having a refractive index at the pump wavelength less than the refractive index of the pump core at the pump wavelength, the cladding being configured to substantially confine radiation of the pump wavelength within the pump core and the gain core, wherein the value $M=16R^2(NA)^2/\lambda^2$ in which R is the gain core radius, NA is the active optical fiber numerical aperture, and $\lambda$ is the peak emitted wavelength, is at least 50, or at least 100.

Another aspect of the disclosure is an active optical fiber having a first end and a second end, the active optical fiber comprising a gain core, the gain core having a diameter in the range of about 50 μm to about 3000 μm, the gain core being configured to emit radiation at at least a peak wavelength emitted wavelength when pumped with pump radiation having a pump wavelength, the gain core being doped with a rare earth element, the gain core having a refractive index at the peak emitted wavelength;

a pump core surrounding the gain core, the pump core having an average thickness in the range of about 15 μm to about 1000 μm, the pump core having a refractive index at the peak emitted wavelength less than the refractive index of the gain core at the peak emitted wavelength, the pump core being configured to substantially confine radiation of the peak emitted wavelength within the gain core;

a cladding surrounding the pump core, the cladding having an average thickness in the range of about 15 μm to about 1000 μm, the cladding having a refractive index at the pump wavelength less than the refractive index of the pump core at the pump wavelength, the cladding being configured to substantially confine radiation of the pump wavelength within the pump core and the gain core.

In certain embodiments according to this aspect of the disclosure, the value $M=16R^2(NA)^2/\lambda^2$ in which R is the gain core radius, NA is the active optical fiber numerical aperture, and $\lambda$ is the peak emitted wavelength, is at least 50, or at least 100.

Another aspect of the disclosure is a source of optical radiation comprising an active optical fiber as described above or as otherwise described herein, having a first end and a second end, and one or more pump sources operatively coupled to the active optical fiber, the one or more pump sources being configured to pump the active optical fiber with radiation of the pump wavelength, the source of optical radiation being configured to output radiation at least the peak emitted wavelength from the second end of the active optical fiber.

Another aspect of the disclosure is an optical system for optically probing an object, the optical system comprising:

a source of optical radiation as described above or as otherwise described herein, the source of optical radiation configured to illuminate the object with radiation of one or more emitted wavelengths;

a detector of optical radiation configured to detect radiation of the one or more emitted wavelengths returned from the object.

Another aspect of the disclosure is a method for providing optical radiation of at least a peak emitted wavelength, the method comprising pumping an active optical fiber as described above or as otherwise described herein with pump radiation of a pump wavelength, the pump radiation being selected to cause the gain core of the active optical fiber to emit the optical radiation of at least the peak emitted wavelength.

Another aspect of the disclosure is a method for optically probing an object, the method comprising illuminating the object with radiation of one or more emitted wavelengths generated according to the method as described above or as otherwise described herein, and detecting radiation of the one or more emitted wavelengths reflected from the object.

Another aspect of the disclosure is a method for imaging an object, the method comprising illuminating the object with radiation of one or more emitted wavelengths generated according to the method as described above or as otherwise described herein, and detecting radiation of the one or more emitted wavelengths reflected from the object.

Another aspect of the disclosure is a method for determining the distance of an object, the method comprising illuminating the object with radiation of one or more emitted wavelengths generated according to the method as described above or as otherwise described herein, and detecting radiation of at least the one or more emitted wavelengths reflected from the object.

Additional aspects of the disclosure will be evident to the person of ordinary skill in the art in view of the description herein

BRIEF DESCRIPTION OF THE DRAWINGS

FIG. 8 is an image of the speckle formed by the 915 nm pump diode (i.e., the one used to pump the fiber ASE source used in the experimental study described herein) itself produced speckle with contrast of 0.46.

FIG. 9 is an image of the speckle formed by the ASE source used in the experimental study described herein (i.e., using the 100 μm diameter gain core, XLMA active optical fiber. The ASE source efficiently suppressed speckle, with a measured contrast of 0.02. The XLMA fiber ASE source was the only ASE source tested that effectively suppressed speckle formation.

FIG. 10 is an image of speckle from an ASE source using an active optical fiber with a 30 μm diameter gain core. It produced speckle with contrast of 0.42.

FIG. 11 is an image of speckle from a multimode superluminescent diode (SLD). It produced speckle with contrast of 0.2.

As the person of skill in the art will appreciate, the drawings are not necessarily drawn to scale, and various elements of the system may, in certain drawings, be omitted for purposes of clarity.

DETAILED DESCRIPTION

Example active optical fibers, systems and methods are described herein. Any example embodiment or feature described herein is not necessarily to be construed as preferred or advantageous over other embodiments or features. The example embodiments and features described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

In the following discussion it is assumed that the reader has the basic knowledge of the structure of optical fibers familiar to the person of skill in the art. Thus, the concepts of a fiber core, cladding, and coatings are not discussed in detail. But, generally, an optical fiber includes a core surrounded by a cladding (both typically made of a glass material), which are surrounded by one or more polymer coatings (e.g., a softer primary coating and a harder secondary coating). As is familiar to the person of skill in the art, radiation having a wavelength propagates generally in the core of the fiber, the diameter of which is typically in the range of a few microns to a several hundred microns, even in some embodiments up to 1500 microns. The refractive index difference between the core and the cladding acts to confine the light in one or more propagating modes, generally in the core of the fiber (although the person of ordinary skill in the art will appreciate that some energy is actually present in the cladding in the region near the core).

The terms "light", "optical", and "radiation", as used herein, are used broadly as understood by one of ordinary skill in the art of optical waveguides, and are not to be limited as pertaining only to the visible range of wavelengths. Refractive indices described herein are described with reference to the wavelength of the radiation. In certain embodiments of the optical devices, systems, and methods described herein, the wavelength is in the visible or near-infrared (e.g., in the range of about 0.5 μm to about 3 μm).

Figure 1:
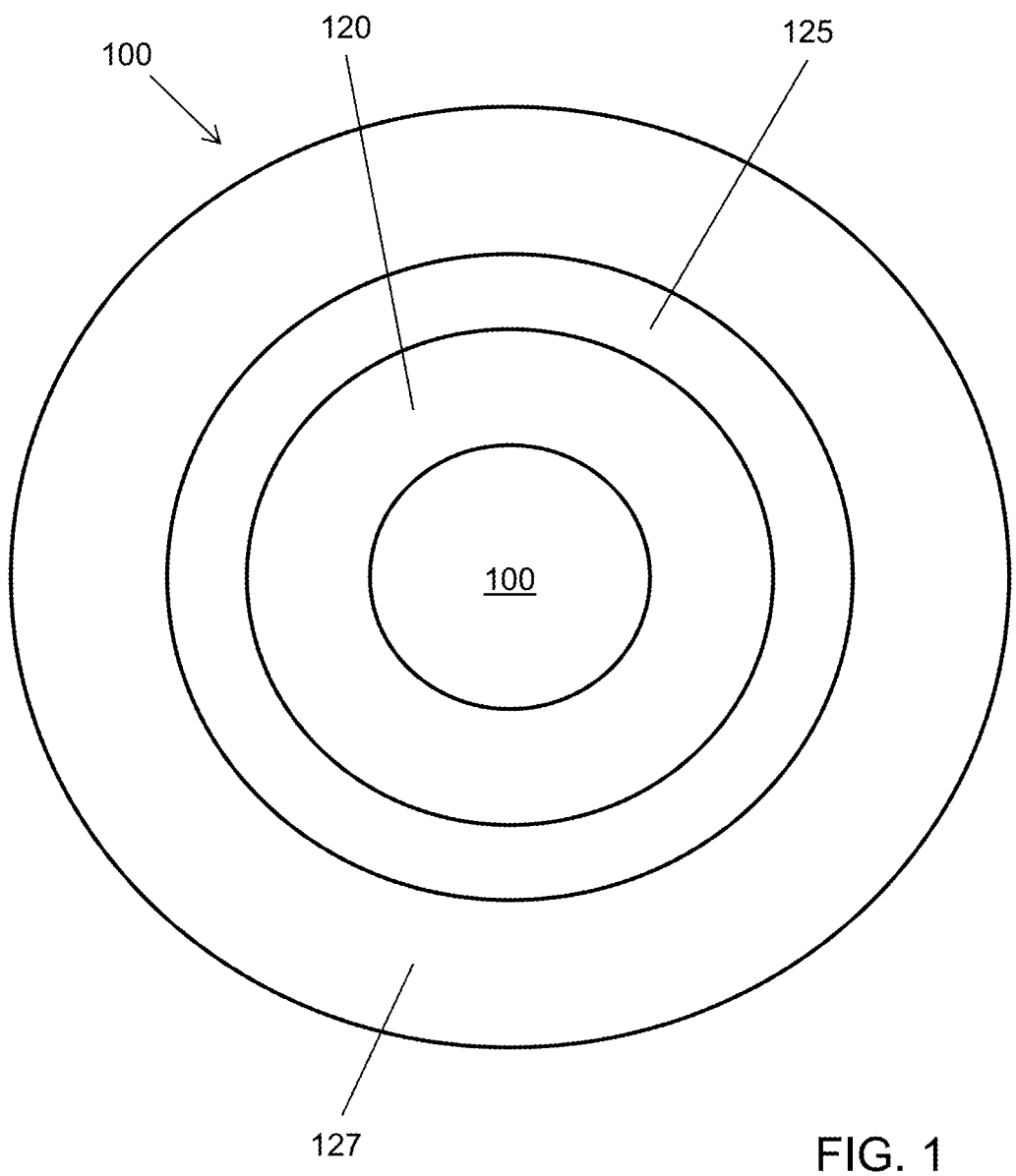
FIG. 1 is a schematic cross-sectional view of an optical fiber according to one embodiment of the disclosure.
Figure 2:
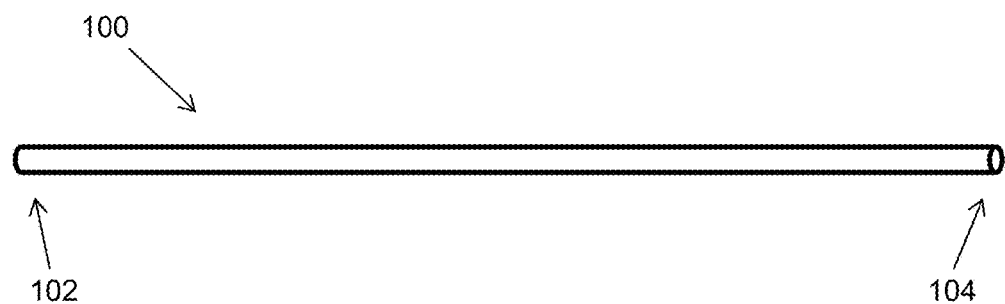
FIG. 2 is a schematic perspective view of the active optical fiber of FIG. 1.

One embodiment of the disclosure is shown in schematic cross-sectional view in FIG. 1 and in schematic perspective view in FIG. 2. Active optical fiber 100 has a first end 102 and a second end 104. As shown in the cross-sectional view of FIG. 1, active optical fiber 100 includes a gain core 110, a pump core 120 surrounding the gain core 110, and a cladding 125 surrounding the pump core 120. Accordingly, the active optical fiber 100 is configured as a dual-clad optical fiber. In certain embodiments, and as shown in FIG. 1, active optical fiber 100 also includes one or more polymeric coating layers 127 to provide protection to the material of the active optical fiber, as is conventional in the optical fiber arts.

The active optical fibers described herein can be made from conventional material using conventional methods in the art. For example, the active optical fiber can be made using various silica-based glasses (e.g., doped silica glasses such as germanosilicates, borosilicates, phosphosilicates, aluminosilicates, fluorosilicates, and combinations thereof), which can include additional dopants as is conventional. Conventional dopants (e.g., germanium, fluorine, aluminum, phosphorus, and boron) can be used to provide the various regions of different refractive index in the active optical fibers as described herein. As is conventional in the art, such materials can provide optical gain, and therefore are useful as active fibers in optical lasers and amplifiers. As the person of ordinary skill in the art will appreciate, doping can also provide desired mechanical or thermal properties to the base glass material, or to provide a desirable environment for the rare earth (e.g., to reduce clustering. Rare earth doped glass compositions are well known in the art, and such compositions can be used or modified by the person of ordinary skill in the art. Conventional methods of making active optical fibers (e.g., stacking together various rods and tubes of different refractive indices, followed by collapsing them to a preform and drawing the preform) can be used to make the active optical fibers described herein. Desirably, the active optical fibers described herein do not include significant void space.

The gain core is configured to emit radiation at at least a peak emitted wavelength when pumped with pump radiation of a pump wavelength, as would be understood by the person of ordinary skill in the active optical fiber arts. To provide such activity, the gain core is doped with a rare earth element, e.g., formed from a doped silica glass doped with the rare earth element. The rare earth element can be selected by the person of ordinary skill in the art, for example, to provide a desired peak emitted wavelength. In certain embodiments of the active optical fibers as described herein, the gain core is doped with one or more of ytterbium, erbium, thulium, praseodymium and neodymium. For example, in one particular embodiment of the active optical fibers as described herein, the gain core is doped with ytterbium. The amount of the rare earth dopant is typically, for example, in the range of 300-50000 ppm (e.g., in the range of 200-20000 ppm, 200-10000 ppm, 200-5000 ppm, 500-50000 ppm, 500-20000 ppm, 500-10000 ppm, or 500-5000 ppm) on an oxide basis, but the person of ordinary skill in the art will appreciate that this amount can vary. For example, the active optical fiber used in the experimental study described below had 1000 ppm ytterbium in the gain core.

Desirably, the peak emitted wavelength is in the visible or in the near-infrared. For example, in certain embodiments of the active optical fibers, systems and methods as described herein, the peak emitted wavelength is in the range of 600 nm to 2000 nm. As the person of ordinary skill in the art will appreciate, the peak emitted wavelength will depend strongly on the particular rare earth dopant as well as on the pump wavelength and the material from which the gain core is formed. In certain embodiments of the active optical fibers, systems and methods as described herein, the peak emitted wavelength is in the range of 600 nm to 1700 nm, or in the range of 600 nm to 1400 nm, or in the range of 600 nm to 1100 nm, or in the range of 800 nm to 2000 nm, or in the range of 800 nm to 1700 nm, or in the range of 800 nm to 1400 nm, or in the range of 800 nm to 1100 nm, or in the range of 1000 nm to 2000 nm, or in the range of 1000 nm to 1700 nm, or in the range of 1000 nm to 1400 nm, or in the range of 1000 nm to 1100 nm.

The gain core can be formed from a variety of particular materials. For example, the gain core can be formed from a glass material made as described in U.S. Pat. No. 8,557,171 and in A. Langner et al., "A new material for high power laser fibers," *Proc. SPIE* 6873, 687311 (2008), each of which is hereby incorporated herein by reference in its entirety. Such doped glass materials (e.g., with ytterbium-doping) are available from Heraeus Quarzglass (Kleinostheim, Germany).

In the active optical fibers, systems and methods described herein, the gain core has an extra-large mode area. Accordingly, in certain embodiments of the active optical fibers, systems and methods described herein, the gain core has a diameter in the range of about 50 μm to about 3000 μm. In certain such embodiments, the gain core has a diameter in the range of about 50 μm to about 2500 μm, or about 50 μm to about 2000 μm, or about 50 μm to about 1500 μm, or about 50 μm to about 1200 μm, or about 50 μm to about 300 μm, or about 50 μm to about 250 μm, or about 50 μm to about 200 μm, or about 50 μm to about 150 μm, or about 50 μm to about 120 μm, or about 80 μm to about 2500 μm, or about 80 μm to about 2000 μm, or about 80 μm to about 1500 μm, or about 80 μm to about 1200 μm, or about 80 μm to about 300 μm, or about 80 μm to about 250 μm, or about 80 μm to about 200 μm, or about 80 μm to about 150 μm, or about 80 μm to about 120 μm, or about 100 μm to about 2500 μm, or about 100 μm to about 2000 μm, or about 80 μm to about 1500 μm, or about 100 μm to about 1200 μm, or about 100 μm to about 300 μm, or about 100 μm to about 250 μm, or about 100 μm to about 200 μm, or about 100 μm to about 150 μm, or about 100 μm to about 120 μm. For example, in the experimental study described below, the gain core has a diameter of about 100 μm. In certain embodiments of the active optical fibers, systems and methods as described herein, and as shown in FIG. 1, the cross-sectional shape of the gain core is substantially circular.

In certain embodiments of the active optical fibers, systems and methods described herein, the gain core has an area in the range of about 1962 $\mu m^2$ to about $7 \times 10^6$ $\mu m^2$. In certain such embodiments, the gain core has an area in the range of about 1962 $\mu m^2$ to about $4.9 \times 10^6$ $\mu m^2$, or about 1962 $\mu m^2$ to about $3.1 \times 10^6$ $\mu m^2$, or about 1962 $\mu m^2$ to about $1.7 \times 10^6$ $\mu m^2$, or about 1962 $\mu m^2$ to about $1.1 \times 10^6$ $\mu m^2$, or about 1962 $\mu m^2$ to about $7 \times 10^4$ $\mu m^2$, or about 1962 $\mu m^2$ to about $4.9 \times 10^4$ $\mu m^2$, or about 1962 $\mu m^2$ to about $3.1 \times 10^4$ $\mu m^2$, or about 1962 $\mu m^2$ to about $1.7 \times 10^4$ $\mu m^2$, or about 1962 $\mu m^2$ to about $1.1 \times 10^4$ $\mu m^2$, or about 5024 $\mu m^2$ to about $4.9 \times 10^6$ $\mu m^2$, or about 5024 $\mu m^2$ to about $3.1 \times 10^6$ $\mu m^2$, or about 5024 $\mu m^2$ to about $1.7 \times 10^6$ $\mu m^2$, or about 5024 $\mu m^2$ to about $1.1 \times 10^6$ $\mu m^2$, or about 5024 $\mu m^2$ to about $7 \times 10^4$ $\mu m^2$, or about 5024 $\mu m^2$ to about $4.9 \times 10^4$ $\mu m^2$, or about 5024 $\mu m^2$ to about $3.1 \times 10^4$ $\mu m^2$, or about 5024 $\mu m^2$ to about $1.7 \times 10^4$ $\mu m^2$, or about 5024 $\mu m^2$ to about $1.1 \times 10^4$ $\mu m^2$, or about 7850 $\mu m^2$ to about $4.9 \times 10^6$ $\mu m^2$, or about 7850 $\mu m^2$ to about $3.1 \times 10^6$ $\mu m^2$, or about 7850 $\mu m^2$ to about $1.7 \times 10^6$ $\mu m^2$, or about 7850 $\mu m^2$ to about $1.1 \times 10^6$ $\mu m^2$, or about 7850 $\mu m^2$ to about $7 \times 10^4$ $\mu m^2$, or about 7850 $\mu m^2$ to about $4.9 \times 10^4$ $\mu m^2$, or about 7850 $\mu m^2$ to about $3.1 \times 10^4$ $\mu m^2$, or about 7850 $\mu m^2$ to about $1.7 \times 10^4$ $\mu m^2$, or about 7850 $\mu m^2$ to about $1.1 \times 10^4$ $\mu m^2$. For example, in the experimental study described below, the gain core has an area of about 7850 $\mu m^2$.

Surrounding the gain core is a pump core, as shown in the cross-sectional view of FIG. 1. In certain embodiments, and as shown in FIG. 1, the cross-sectional shape of the pump core is substantially circular. In certain embodiments, and as shown in FIG. 1, the cross-sectional shape of the pump core is substantially the same as the cross-sectional shape of the gain core (e.g., in FIG. 1, both are substantially circular). In other embodiments of the active optical fibers, systems and methods as described herein, the pump core has a cross-sectional shape that is polygonal. For example, the pump core can be shaped as a regular polygon, for example, selected from square, pentagonal, hexagonal, heptagonal, octagonal, nonagonal, decagonal and dodecagonal. As described below with respect to the experimental study, in some embodiments the pump core is octagonal in shape.

The pump core is configured to substantially confine radiation of the peak emitted wavelength within the gain core, as is conventional for dual-clad optical fibers. Accordingly, the pump core has a refractive index at the peak emitted wavelength that is less than the refractive index of the gain core at the peak emitted wavelength; the person of ordinary skill in the art will select a refractive index difference between the pump core and the cladding to provide the desired level of confinement. In certain embodiments of the active optical fibers, systems and methods described herein, the active optical fiber has a numerical aperture (i.e., for the gain core) in the range of 0.07 to 0.3, for example, 0.07 to 0.25, or 0.07 to 0.20 or 0.07 to 0.15, or 0.07 to 0.12, or 0.09 to 0.3, or 0.09 to 0.25, or 0.09 to 0.20 or 0.09 to 0.15, or 0.09 to 0.12, or 0.10 to 0.3, or 0.10 to 0.25, or 0.10 to 0.20 or 0.10 to 0.15, or 0.10 to 0.12. For example, in the experimental study described below, the active optical fiber had a numerical aperture of about 0.1.

The pump core is configured to guide radiation of the pump wavelength (i.e., substantially confined by the cladding gas described below). In certain embodiments of the active optical fibers, systems and methods described herein, the pump core has an average thickness (i.e., radially averaged) in the range of about 15 μm to about 1000 μm. For example, in certain embodiments of the active optical fibers, systems and methods described herein, the pump core has an average thickness in the range of about 15 µm to about 800 µm, or about 15 µm to about 600 µm, or about 15 µm to about 400 µm, or about 15 µm to about 300 µm, or about 15 µm to about 200 µm, or about 30 µm to about 1000 µm, or about 30 µm to about 800 µm, or about 30 µm to about 600 µm, or about 30 µm to about 400 µm, or about 30 µm to about 300 µm, or about 30 µm to about 200 µm, or about 75 µm to about 1000 µm, or about 75 µm to about 800 µm, or about 75 µm to about 600 µm, or about 75 µm to about 400 µm, or about 75 µm to about 300 µm, or about 75 µm to about 200 µm, or about 100 µm to about 1000 µm, or about 100 µm to about 800 µm, or about 100 µm to about 600 µm, or about 100 µm to about 400 µm, or about 100 µm to about 300 µm, or about 100 µm to about 200 µm.

The cladding surrounds the pump core and is configured to substantially confine radiation of the pump wavelength within the pump core and the gain core. Accordingly, the cladding has a refractive index at the pump wavelength that is less than the refractive index of the pump core at the pump wavelength; the person of ordinary skill in the art will select a refractive index difference between the pump core and the cladding to provide the desired level of confinement, as in conventional in the dual-clad optical fiber arts. In certain embodiments of the active optical fibers, systems and methods described herein, the cladding has an average thickness in the range of about 15 µm to about 1000 µm. For example, in particular embodiments of the active optical fibers, systems and methods described herein, the cladding has an average thickness in the range of about 15 µm to about 800 µm, or about 15 µm to about 600 µm, or about 15 µm to about 400 µm, or about 15 µm to about 300 µm, or about 15 µm to about 200 µm, or about 15 µm to about 100 µm, or about 30 µm to about 1000 µm, or about 30 µm to about 800 µm, or about 30 µm to about 600 µm, or about 30 µm to about 400 µm, or about 30 µm to about 300 µm, or about 30 µm to about 200 µm, or about 30 µm to about 100 µm, or about 75 µm to about 1000 µm, or about 75 µm to about 800 µm, or about 75 µm to about 600 µm, or about 75 µm to about 400 µm, or about 75 µm to about 300 µm, or about 75 µm to about 200 µm, or about 100 µm to about 1000 µm, or about 100 µm to about 800 µm, or about 100 µm to about 600 µm, or about 100 µm to about 400 µm, or about 100 µm to about 300 µm, or about 100 µm to about 200 µm.

As the person of ordinary skill in the art will appreciate, the gain core, the pump core can be made from a single layer or a plurality of layers (i.e., having substantially discontinuous refractive index boundaries between them), and can have a constant or graded refractive index profile. Pump core and cladding material glass compositions are well known in the art, and such compositions can be used or modified by the person of ordinary skill in the art for use in the optical fibers, systems and methods of the present disclosure.

Critically, the active optical fibers described herein can provide highly multimode emission at the peak emitted wavelength. The number of transverse spatial modes M can be estimated using the relationship $M=16R^2(NA)^2/\lambda^2$, where R is the gain core radius and NA is the numerical aperture of the fiber (i.e., of the gain core at the peak emitted wavelength), and $\lambda$ is the peak emitted wavelength. In certain embodiments of the active optical fibers, systems and methods as described herein the value $M=16R^2(NA)^2/\lambda^2$ is at least 100. For example, in certain embodiments, the value $M=16R^2(NA)^2/\lambda^2$ is at least 200, at least 250, at least 300, or in the range of 100-3000, 100-2000, 100-1500, 100-1000, 100-800, 100-600, 100-500, 100-400, 200-3000, 200-2000, 200-1500, 200-1000, 200-800, 200-600, 200-500, 200-400, 250-3000, 250-2000, 250-1500, 250-1000, 250-800, 250-600, 250-500, 250-400, 300-3000, 300-2000, 300-1500, 300-1000, 300-800, 300-600, 300-500 or 300-400. For example, in the experimental study described herein, the active optical fiber having a value of M of about 360 provided substantially speckle-free imaging, while a similar active optical fiber supporting about 10 spatial modes provided a substantial amount of speckle.

Desirably, the active optical fiber is configured so as to substantially avoid lasing. That is, desirably, the active optical fiber is not part of a resonant cavity. This can help to ensure that the active optical fiber operates desirably as a broadband ASE source with low temporal coherence. One way to achieve this is to have at least one of the endfaces of the fiber (i.e., at the first end, the second end, or both) formed at an angle of at least 1° from the normal of the fiber axis. For example, in certain embodiments of the active optical fibers, systems and methods as described herein, the first end, the second end, or both have an endface formed at an angle of at least 1°, at least 2°, at least 3°, at least 4°, or in the range of 1°-7°, 2°-7°, 3°-7°, 4°-7°, 1°-6°, 2°-6°, 3°-6°, 4°-6°, 1°-5°, 2°-5°, 3°-5° or 4°-5° from the normal of the fiber axis.

In certain embodiments of the optical fibers as described herein, there is no source of optical radiation having a wavelength within the gain band of the active optical fiber of the optical source operatively coupled to the active optical fiber of the optical source, i.e., in such embodiments the source is configured to act as an ASE source and not an amplifier. Thus, the active optical fiber can provide radiation over a relatively broad wavelength range via ASE. As used herein, the gain band of the active optical fiber is defined as the wavelength band of emissions possible when the active optical fiber is pumped with the pump wavelength, i.e., the wavelengths of radiation that can be amplified by the active optical fiber.

Figure 3:
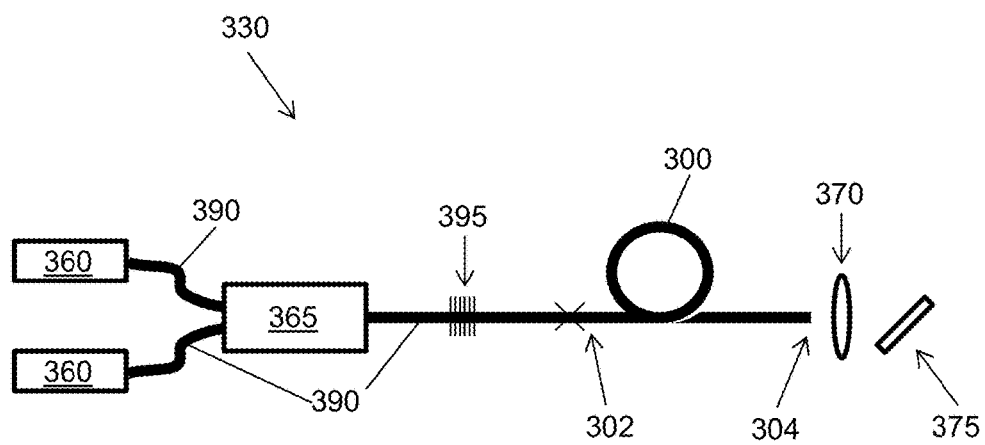
FIG. 3 is schematic view of a source of optical radiation according to one embodiment of the disclosure.

Another aspect of the disclosure is a source of optical radiation; one such embodiment is shown in schematic view in FIG. 3. Source of optical radiation 350 includes an active optical fiber 300 (e.g., as described in any embodiment herein) having a first end 302 and a second end 304. The source of optical radiation 350 also includes one or more pump sources 360 operatively coupled to the active optical fiber 300 and configured to pump the active optical fiber with radiation of the pump wavelength (i.e., such that pump radiation is guided within the pump core and the gain core of the active optical fiber). The source of optical radiation is configured to output radiation of at least the peak emitted wavelength from the second end of the active optical fiber.

The person of ordinary skill in the art will appreciate that the one or more pump sources can be operatively coupled to the optical fiber in a variety of manners. For example, in the configuration shown in FIG. 3, two pump sources 360 are coupled through a pump combiner 365 and coupled directly to the first end 302 of the active optical fiber, with the connections between the pump sources 360 and the combiner 365, and between the combiner 360 and the active optical fiber 300 being made using passive multimode fibers 390 (an "X" indicates a fiber splice). In certain embodiments of the systems and methods as described herein, and as shown in FIG. 3, the one or more pump sources are configured in a co-pumping configuration with respect to the active optical fiber.

As the person of ordinary skill in the art will appreciate, amplified spontaneous emission in the gain core of the optical fiber can propagate in both directions, i.e., both toward the first end and the second end. It can be desirable in certain embodiments to redirect emitted radiation that is propagating in the gain core toward the first end such that it instead propagates toward the second end to be emitted therefrom. Accordingly, in certain embodiments, a reflector is disposed at the first end of the active optical fiber, either outside the active optical fiber or within the active optical fiber near the first end thereof. The reflector is configured to reflect radiation one or more emitted wavelengths, but pass radiation of the pump wavelength. The reflector can be, for example, a dichroic mirror or a Bragg grating. For example, the source of optical radiation of FIG. 3 includes a fiber Bragg grating 395 in the path at the first end of the active optical fiber.

So that the source of optical radiation can be more useful in, for example, imaging applications, it can be desirable to dispose one or more optics at the second end of the active optical fiber, configured to focus, collimate, or spread radiation emitted from the second end of the active optical fiber. As the person of ordinary skill in the art will appreciate, the optics can be, for example, refractive optics (e.g., lenses), reflective optics (e.g., mirrors), or diffractive optics (e.g., Fresnel elements), or a combination thereof. For example, in the embodiment of FIG. 3, the source of optical radiation includes a collimating lens 370 disposed at the second end of the active optical fiber and configured to collimate the radiation output from the second end of the active optical fiber. The person of ordinary skill in the art will appreciate that the configuration of such optics will depend on the particular use desired for the source of optical radiation.

In many sources of optical radiation, the active optical fiber will not completely absorb the pump radiation from the one or more pump sources. Accordingly, in certain embodiments of the systems and methods described herein, the source of optical radiation further includes a filter operatively disposed at the second end of the active optical fiber and configured to separate radiation of the pump wavelength from radiation of the peak emitted wavelength. For example, in the embodiment of FIG. 3, the source of optical radiation includes a dichroic filter 375 disposed at the second end of the active optical fiber and configured to separate radiation of the pump wavelength from radiation of the peak emitted wavelength.

Desirably, the source of optical radiation can provide emitted optical radiation having a relatively broad spread of wavelengths. The spread of wavelengths need not be spread symmetrically around the peak emitted wavelength, and in many cases in fact the spread of wavelengths will be asymmetrically distributed around the peak wavelength. In certain embodiments of the systems and methods as described herein, the spread in wavelengths at the half-maximum peak emission power is at least about 30 nm. For example, in certain embodiments, the spread in wavelengths at the half-maximum peak emission power is at least about 50 nm, at least about 65 nm, in the range of 30 nm-150 nm, in the range of 30 nm-100 nm, in the range of 50 nm-150 nm, in the range of 50 nm-100 nm, in the range of 65 nm-200 nm, or in the range of 65 nm-150 nm.

In certain embodiments of the sources as described herein, there is no source of optical radiation having a wavelength within the gain band of the active optical fiber of the optical source operatively coupled to the active optical fiber. In such embodiments, the source is configured to act as an ASE source and not an amplifier.

The person of ordinary skill in the art will configure the sources of optical radiation described herein to provide a desired output power, e.g., for a particular use such as, for example, an imaging application, a ranging application, or a LIDAR application. For example, in certain embodiments of the systems and methods as described herein, the source of optical radiation is configured to output radiation having a power in the range of about 1 mW to about 50 W. For example, in particular embodiments of the systems and methods as described herein, the source of optical radiation is configured to output radiation having a power in the range of about 1 mW to about 20 W, about 1 mW to about 10 W, about 1 mW to about 5 W, about 1 mW to about 1 W, about 10 mW to about 50 W, about 10 mW to about 20 W, about 10 mW to about 10 W, about 10 mW to about 5 W, about 10 mW to about 1 W, about 100 mW to about 50 W, about 100 mW to about 20 W, about 100 mW to about 10 W, about 100 mW to about 5 W or about 100 mW to about 1 W.

Another aspect of the disclosure is a method for providing optical radiation of at least a peak emitted wavelength. The method includes pumping an active optical fiber as described herein with pump radiation of a pump wavelength. The pump radiation is selected to cause the gain core of the active optical fiber to emit the optical radiation of at least the peak emitted wavelength. In certain such embodiments, the pumping is performed without inputting to the active optical fiber a substantial amount of radiation within the gain band of the optical fiber, i.e., such that the source acts as an ASE source and not an amplifier. The methods described herein can be performed as noted with respect to the descriptions of how the source of optical radiation is "configured."

Another aspect of the disclosure is an optical system for optically probing (e.g., imaging or sensing) an object. The optical system includes a source of optical radiation as described herein, configured to illuminate the object with radiation of one or more emitted wavelengths (i.e., from the second end of the active optical fiber). The optical system further includes a detector of optical radiation configured to detect radiation of the one more emitted wavelengths returned from (e.g., via reflection) from the object. In certain embodiments, there is no source of optical radiation having a wavelength within the gain band of the active optical fiber of the optical source operatively coupled to the active optical fiber, i.e., such that the source is configured to act as an ASE source and not an amplifier.

Figure 4:
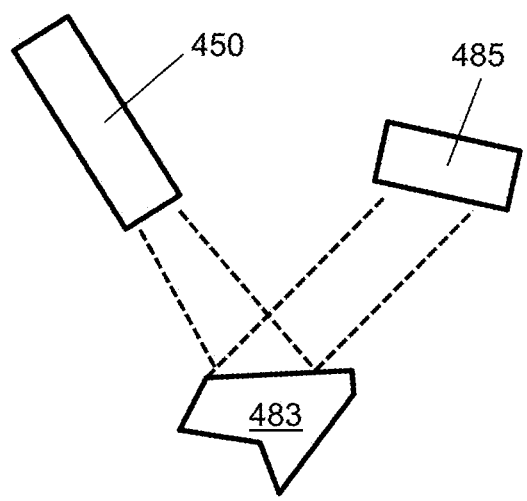
FIG. 4 is a schematic view of an optical system according to one embodiment of the disclosure.

An example of such an optical system is shown in FIG. 4. Optical system 480 includes a source of optical radiation 450, configured to illuminate object 483 with radiation of one or more emitted wavelengths (i.e., emitted from the second end of the active optical fiber of the source, as shown by the dotted lines). The optical system further includes a detector 485 configured to detect radiation of the one or more emitted wavelengths.

Another aspect of the disclosure is a method for optically probing an object. The method includes illuminating the object with radiation of at least the peak emitted wavelength from a source of optical radiation as described herein, or generated according to a method as described herein, and detecting radiation of at least the peak emitted wavelength returned from the object.

For example, one aspect of the disclosure is a method for imaging an object. The method includes illuminating the object with radiation of at least the peak emitted wavelength from a source of optical radiation as described herein, or generated according to a method as described herein, and detecting radiation of at least the peak emitted wavelength reflected from the object. In another aspect, the disclosure provides a method for determining the distance and/or speed of an object. The method includes illuminating the object with radiation of at least the peak emitted wavelength from a source of optical radiation as described herein, or generated according to a method as described herein, and detecting radiation of at least the peak emitted wavelength reflected from the object.

In certain embodiments of the optical systems and methods described herein, the detector of optical radiation is configured to detect, or the detection is performed to detect radiation over a wavelength range that is at least 50%, at least 70%, or even at least 100% of the spread of wavelengths at the half-maximum peak emission power of the source of optical radiation. For example, in certain embodiments of the optical systems and methods described herein, the detector of optical radiation is configured to detect, or the detection is performed to detect radiation over a wavelength range that includes the peak emitted wavelength and is at least 30 nm, at least 50 nm, or even at least 70 nm in width. The person of ordinary skill in the art will appreciate that any of a number of detection methodologies can be used, depending on the particular method.

As the person of ordinary skill in the art will appreciate, the optical systems described herein can be configured for a variety of uses. For example, in certain embodiments, the optical systems described herein are configured as a LIDAR system (e.g., a frequency-resolved LIDAR system), an imaging system, an optical coherence tomography system, an optical gyroscope (in which case the object is a length of optical fiber), a spectroscope, a chemical or biological sensor, or a motion sensor. Similarly, in certain embodiments, the methods described herein can be configured to perform a LIDAR measurement (e.g., to determine the distance and/or speed of an object), to perform imaging, to perform optical coherence tomography, to perform gyroscopy, to perform spectroscopy, to perform chemical or biological sensing, or to perform motion sensing. The person of ordinary skill in the art will appreciate that the optical source and detector can be configured accordingly.

The sources of optical radiation, systems and methods described herein can provide virtually speckle-free imaging. For example, in certain embodiments of the sources of optical radiation, systems and methods described herein, the optical source is configured to provide, or the method is performed to provide optical radiation having a speckle contrast no more than about 0.1, no more than about 0.07, no more than about 0.04, no more than about 0.02, or in the range of 0.005-0.1, 0.01-0.1, 0.02-0.1, 0.005-0.07, 0.01-0.07, 0.02-0.07, 0.005-0.04, 0.01-0.04 or 0.02-0.04. For example, the in certain embodiments of the sources of optical radiation, systems and methods described herein, the optical source is configured to provide, or the method is performed to provide optical radiation having a speckle contrast that is undetectable by human perception.

The optical fibers, sources of optical radiation, systems and methods described herein are further described with respect to the following experimental study. This experimental study is not to be construed to limiting the scope of the optical fibers, sources of optical radiation, systems and methods as otherwise described herein.

The present inventors have devised a novel fiber-based ASE source that combines low temporal and low spatial coherence, similar to an LED, with the high power per spatial mode associated with lasers and traditional single spatial mode ASE sources. The fiber ASE source provides 270 mW of CW emission centered at $\lambda=1055$ nm with 74 nm 3 dB bandwidth (full width at half maximum). The emission is distributed among as many as 70 spatial modes, allowing for efficient speckle suppression, especially when combined with spectral compounding. Speckle-free full field imaging using the fiber ASE source is also demonstrated. By providing broadband, speckle free emission with ~40 dB higher power per mode than an LED, the fiber ASE source is especially suited for high-speed, full-field imaging and coherent ranging applications.

Figure 5:
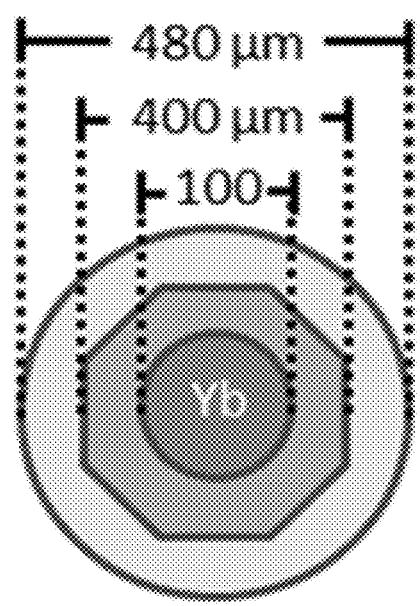
FIG. 5 is a cross-sectional view of the Yb-doped XLMA fiber used in the experimental study described herein. The fiber includes of a 100 μm-diameter, Yb-doped gain core with NA=0.1 surrounded by an octagonal 400 μm pump core and a 480 μm outer cladding.
Figure 6:
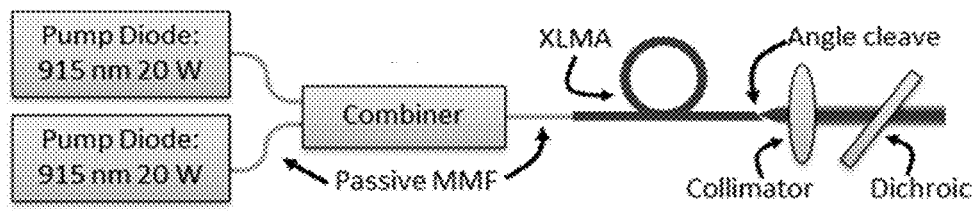
FIG. 6 is a schematic view of the ASE source used in the experimental study described herein. Two 20 W pump diodes are coupled into the pump core of the XLMA fiber, the end of which is angle-cleaved to minimize feedback.

To achieve highly multimode emission from an optical fiber, an optical fiber with an extra-large mode area (XLMA) gain core was used. The basis of the XLMA design is synthetic fused bulk silica doped with ytterbium and other co-dopants that form the active core of the fiber. See A. Langner et al., "A new material for high power laser fibers," *Proc. SPIE* 6873, 687311 (2008); U.S. Pat. No. 8,557,171, each of which is hereby incorporated herein by reference in its entirety. This rare earth doped bulk silica is commercialized by Heraeus Quarzglas (Kleinostheim, Germany). The XLMA fiber used in the ASE source of this experimental study has a 100 µm-diameter, Yb-doped gain core with a numerical aperture (NA) of 0.1. The gain core is surrounded by a 400 µm diameter octagonal pump core, and a 480 µm diameter outer cladding. A ytterbium concentration of 1000 ppm in the core resulted in 7.8 dB/m absorption at 972 nm. The pump core provides confinement for the pump light, thus it is also known in the art as an inner cladding for the gain core. The XLMA fiber is shown in schematic cross-sectional view in FIG. 5. The number of transverse spatial modes supported in the Yb-doped gain core of the fiber is estimated to be $M=16R^2(NA)^2/\lambda^2=360$ at $\lambda=1050$ nm, where R is the gain core radius. See K. Okamoto, *Fundamentals of Optical Waveguides* (Elsevier, 2006). The XLMA fiber was optically pumped using two 20 W laser diodes operating at $\lambda=915$ nm. A fiber combiner was used to couple the output beams from the two pump diodes into the pump core of a 4.4 meter long piece of XLMA fiber, as shown in the schematic view of FIG. 6. The output end of the XLMA fiber was cleaved at an angle of 4° to minimize feedback which could lead to undersirable lasing. Minimization of feedback ensured that the fiber operated as a broadband amplified spontaneous emission source with low temporal coherence. See D. Marcuse, "Reflection losses from imperfectly broken fiber ends.," *Appl. Opt.* 14, 3016-3020 (1975). Emission from the end of the XLMA was then collimated and the remaining 915 nm pump light was filtered out by a dichroic filter.

Figure 7:
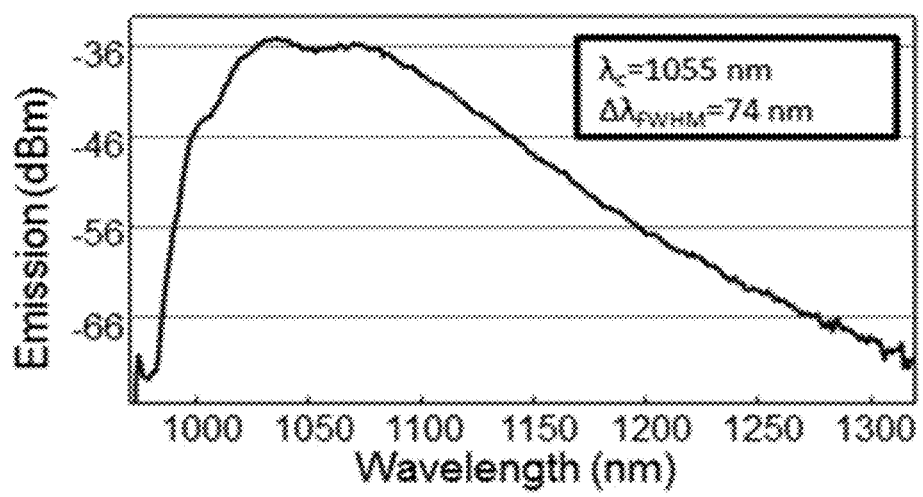
FIG. 7 is an emission spectrum from the fiber ASE source used in the experimental study described herein. The emission is centered at 1055 nm with a 3 dB bandwidth of 74 nm.

The emission of the fiber ASE source was characterized using a power meter and an optical spectrum analyzer. The fiber ASE source produced 270 mW of continuous wave emission with a center wavelength of 1055 nm and a 3 dB bandwidth of 74 nm, as shown in FIG. 7. While the increase of the emission power with the pump power is in excess of a linear increase, no saturation in the output power was observed at the maximum pump power of 40 W, indicating that higher emission can be possible by incorporating additional pump diodes. The relatively low quantum efficiency of the fiber ASE source of this experimental study is due to a mode mismatch between the passive multimode fiber of the combiner and the octagonal pump core of the XLMA fiber, which significantly reduced the amount of pump light coupled into the XLMA fiber. In addition, approximately half of the fiber ASE was in the counter-propagating direction of the pump light and not collected in the experiments described herein. Nonetheless, the 270 mW emission in the co-propagating direction is sufficient for many imaging applications and allowed the characterization of the spatial and temporal coherence of the XLMA fiber ASE source. Moreover, the fiber ASE source already provides ~4 mW/nm, which is comparable to commercially available supercontinuum sources. See N. Savage, "Supercontinuum sources," *Nat. Photon.* 3, 114-115 (2009).

The ability of the fiber ASE source to suppress speckle formation was characterized. Speckle is a coherent artifact known to corrupt image formation and can be characterized by the speckle contrast $C=\sigma_I/<I>$, where $\sigma_I$ is the standard deviation of the intensity and $<I>$ is the average intensity. See J. W. Goodman, *Speckle Phenomena in Optics* (Roberts & Company, 2007). A recent study on the human perception of speckle found that speckle with contrast below ~0.04 could not be detected, providing a guideline for the development of a light source with sufficiently low spatial coherence for imaging. see S. Roelandt et al., "Human speckle perception threshold for still images from a laser projection system," *Opt. Express* 22, 23965 (2014).

Figure 8:
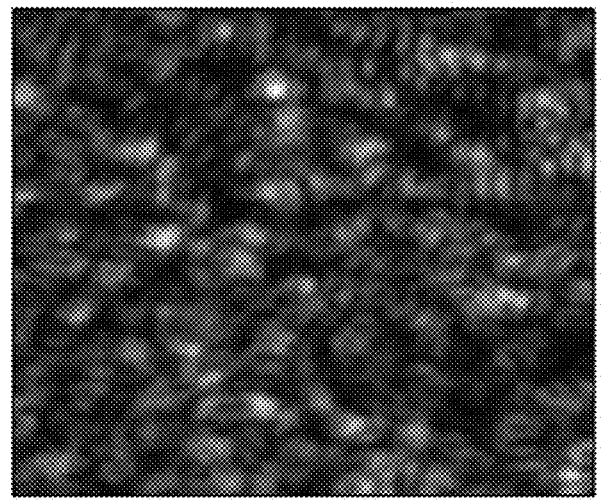
FIGS. 8-11 are images of speckle formed by light emitted from various sources, incident on a CCD camera after passing through a ground glass diffuser and a linear polarizer.
Figure 9:
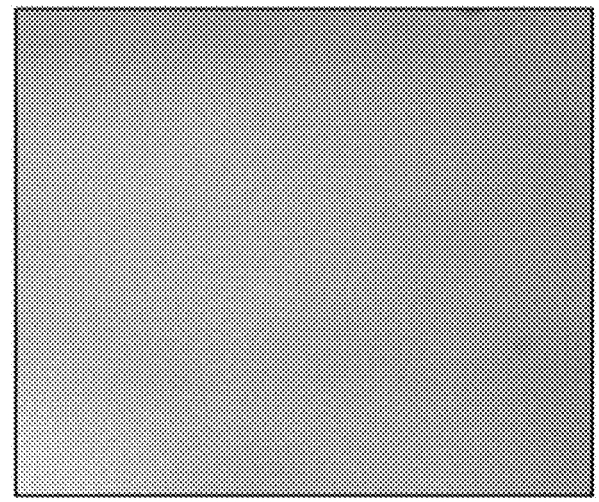

To measure the speckle pattern formed by a light source, the emission from the ASE source was collimated onto a ground glass diffuser and images of the transmitted light were recorded on a CCD camera (Allied Vision Mako-G125B). For comparison, the speckle pattern formed by light from one of the 915 nm pump diodes was first measured. As shown in FIG. 8, the spatially coherent 915 nm pump diode produced a clear speckle pattern with contrast of ~0.46. The speckle contrast was less than unity since the pump diode consists of a few separate emitters coupled into a multimode fiber. The experiment was repeated while illuminating the diffuser with emission from the fiber ASE source which produced the image shown in FIG. 9. The uniform intensity across the image confirmed that the fiber ASE source efficiently suppressed speckle formation. Based on the image in FIG. 9, we a speckle contrast of ~0.02 was calculated, which is below the human detection threshold in an imaging setting.

Figure 10:
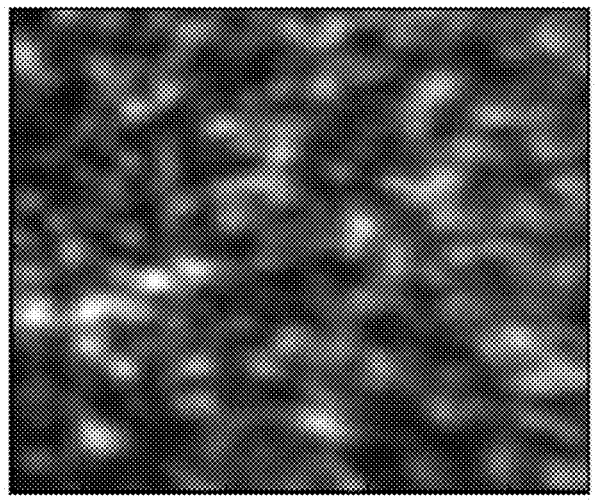
Figure 11:
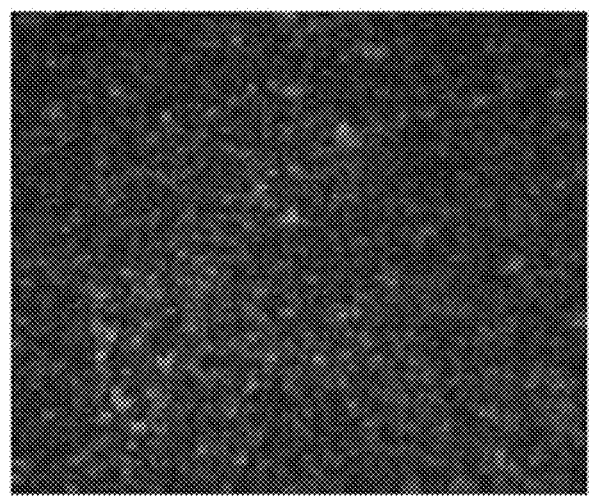

In addition to the 105 µm diameter XLMA fiber, speckle formation was tested using two additional ASE sources: a fiber ASE source based on a 30 µm diameter, Yb-doped fiber (Nufern LMA-YDF-30/400-VIII, NA=0.06; East Granby, Conn., USA) that supports ~10 spatial modes at $\lambda=1050$ nm, and a commercially available, semiconductor-based multimode superluminescent diode (Superlum M-381). The 30 µm diameter fiber ASE source produced moderately broadband emission with a 3 dB bandwidth of ~20 nm; however, as shown in FIG. 10, the emission also produced human-detectable speckle with contrast of ~0.42. The multimode SLD provided ~150 mW of power at $\lambda=800$ nm with a 3 dB bandwidth of 40 nm. Nonetheless, emission from the SLD still produced speckle with contrast of ~0.2, as shown in FIG. 11. Thus, the XLMA fiber ASE source was the only ASE source tested that suppressed speckle to acceptable levels for full-field imaging applications.

The speckle contrast depends on the number of mutually incoherent spatial modes present in the illumination. Different spatial modes produce distinct speckle patterns which sum in intensity, thereby reducing the speckle contrast to $C=M^{-1/2}$, where M is the number of spatial modes. J. W. Goodman, *Speckle Phenomena in Optics* (Roberts & Company, 2007). But even if the XLMA fiber ASE was distributed equally among all ~360 passive modes of the fiber, the speckle contrast might be expected to be reduced to only $360^{-1/2}=0.05$. The measured speckle contrast of 0.02 shown in FIG. 9 would, in contrast, require contributions from ~2500 mutually incoherent modes if there were no spectral compounding. But the broadband ASE does enable spectral compounding, as different spectral modes can also contribute to the speckle reduction. Still, it remains difficult to estimate just how many spatial modes are excited from the spectrally integrated speckle patterns measured above. Also the information of the number of spatial modes at any given wavelength is important for applications such as spectral-domain OCT in which a spectrally-resolved detection would limit the effect of spectral compounding.

Figure 12:
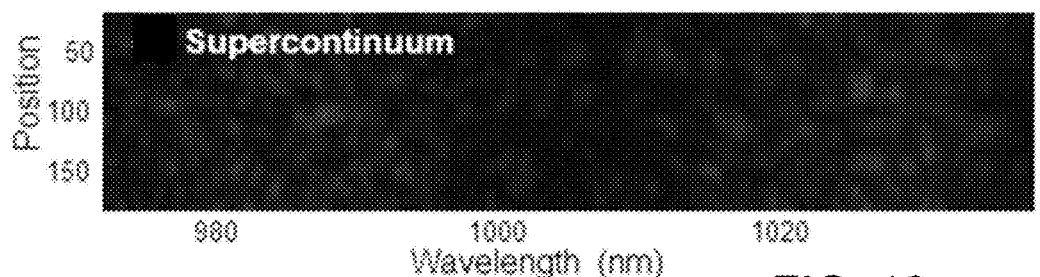
FIG. 12 is a spectrally-dispersed speckle pattern formed by coupling emission from a supercontinuum source through a multimode fiber into an imaging spectrometer. The high-contrast speckle observed at each wavelength confirms that the supercontinuum source has high spatial coherence.

In order to separate the effect of averaging over the spatial modes from the effect of spectral compounding, the speckle pattern was measured at individual wavelengths using an imaging spectrometer (Acton Research SpectraPro 300i). To do this, the emission from the fiber ASE source was coupled to a passive, 1 meter long multimode fiber (105 µm-diameter core, NA=0.22). The distal end of the multimode fiber was then collimated onto the entrance slit of an imaging spectrometer. At the exit port of the spectrometer a CCD camera (Andor Newton) recorded the spectrally-dispersed one-dimensional (1D) speckle. In the 2D image taken by the CCD camera, the horizontal axis corresponded to wavelength, and the vertical axis to space. In this measurement, the multimode fiber played the role of the diffuser, producing distinct speckle patterns for different spatial modes of the ASE source, while efficiently coupling light into the entrance slit of the spectrometer. However, the speckle patterns formed at the end of a multimode fiber are known to vary as a function of wavelength. See B. Crosignani et al., "Speckle-pattern visibility of light transmitted through a multimode optical fiber," *J. Opt. Soc. Am.* 66, 1312-1313 (1976). A sufficiently long multimode fiber, combined with a broadband light source, can effectively reduce the spatial coherence. See, e.g., N. Takai et al., "Statistical properties of laser speckles produced under illumination from a multimode optical fiber," *J. Opt. Soc. Am. A* 2, 1282-1290 (1985); J. Kim et al., "Optical coherence tomography speckle reduction by a partially spatially coherent source," *J. Biomed. Opt.* 10, 064034 (2005). To confirm that the multimode fiber did not reduce the measured speckle contrast for individual spectral channels resolved by the spectrometer, we first coupled a spatially coherent supercontinuum source (Fianium WhiteLase SC400-4) into the multimode fiber. As shown in FIG. 12, the supercontinuum source produced high-contrast speckle in space at each wavelength. Since the spectral correlation of the speckle pattern (corresponding to the spectral correlation of the multimode fiber) was readily resolved by the spectrometer, we know that the passive multimode fiber will not reduce the contrast of spectrally resolved speckle produced by the ASE source.

Figure 13:
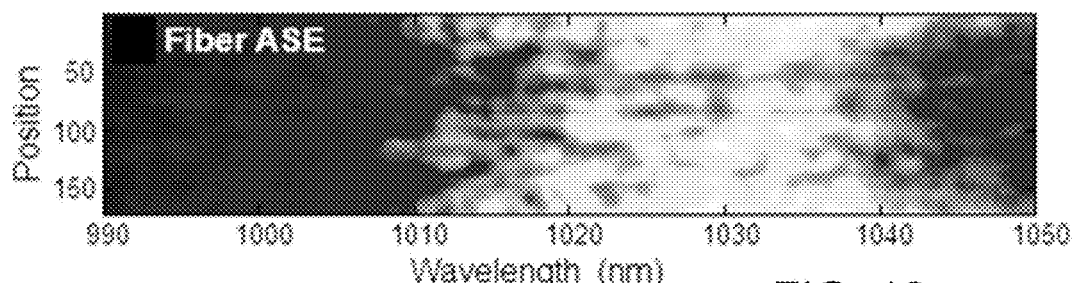
FIG. 13 is a spectrally-dispersed speckle pattern formed by the fiber ASE used in the experimental study described herein. The reduced speckle contrast at each wavelength is indicative of emission distributed among many spatial modes.
Figure 14:
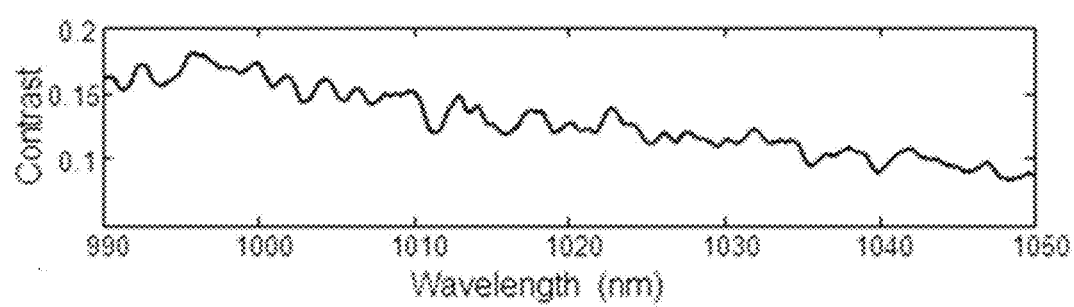
FIG. 14 is a diagram of the spectrally-resolved speckle contrast, calculated from the 1D speckle pattern in space at each wavelength in FIG. 13.
Figure 15:
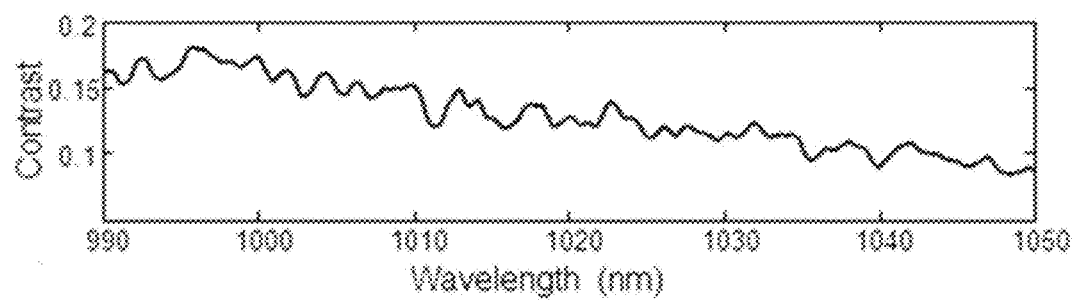
FIG. 15 is a diagram of the number of spatial modes present at each wavelength, calculated from the spectrally-resolved speckle contrast, indicating that emission from the fiber ASE source is distributed among 25 to 75 spatial modes.

The experiment was repeated using the fiber ASE source. The spectrally-dispersed speckle pattern formed by the fiber ASE source is shown in FIG. 13. The speckle contrast at any given wavelength is clearly reduced in comparison to the supercontinuum source due to the presence of many spatial modes in the fiber ASE. Based on the image in FIG. 13, the spectrally-resolved speckle contrast was calculated, as shown in FIG. 14. From this contrast the number of spatial modes present at each wavelength was estimated by $M=C^{-2}/2$, where the factor of 2 accounts for polarization mixing in the multimode fiber. FIG. 15 demonstrates that the number of spatial modes increased with wavelength from ~25 at $\lambda=990$ nm to almost 75 spatial modes at $\lambda=1050$ nm, near the peak of the emission spectrum. Note that due to the responsivity of the Si CCD camera used to record the spectrally-dispersed speckle patterns, a measurement the number of modes present in the long-wavelength half of the emission spectrum was unavailable. Nonetheless, FIG. 15 illustrates that the number of spatial modes increases from the tail to the center of the gain spectrum. We also note that although the XLMA fiber supports ~360 passive modes, the emission was distributed among less than one fourth of these modes, even at the peak of the gain spectrum. Without intending to be limited by theory, the inventors surmise that this could be the result of increased bending loss experienced by the higher order modes and/or the mode competition for gain. Nonetheless, the XLMA fiber ASE source distributed emission among many more spatial modes than the multimode SLD, enabling efficient speckle suppression where the SLD did not.

It was surprising to the inventors to find that the multimode fiber ASE source supported such a large number of spatial modes, whereas the ASE produced by a semiconductor-based multimode SLD maintained relatively high spatial coherence and produced high-contrast speckle. In addition, observed similarly strong mode competition for gain was previously observed in a semiconductor-based, multimode Fabry-Perot laser in which lasing occurred in only a few of the ~450 transverse spatial modes supported by the cavity. B. Redding et al., "Low spatial coherence electrically pumped semiconductor laser for speckle-free full-field imaging," Proc. Natl. Acad. Sci. 112, 1304-1309 (2015). However, without intending to be bound by theory, the present inventors believe there are at least two factors which facilitate the fiber ASE source to support a large number of modes. First, the SLD and the multimode Fabry-Perot laser both used semiconductor quantum wells as gain materials which allow for efficient carrier diffusion, thereby increasing the effects of mode competition. H. Statz et al., "Spectral output of semiconductor lasers," *J. Appl. Phys.* 35, 2581-2585 (1964). In contrast to a quantum well, the Yb dopants in the XLMA fiber are spatially localized, leading to spatial hole burning which can reduce the effects of mode competition. See, e.g., J. Hao et al., "Effect of mode competition on photodarkening distribution of Yb-doped fiber laser," *Opt. Commun.* 287, 167-175 (2013); A. Cerjan et al., "Steady-state ab initio laser theory for complex gain media," *Opt. Express* 23, 6455-6477 (2015). Second, the fiber bending and imperfections (local fluctuation of the refractive index and variation of fiber cross section) in the XLMA fiber introduce mode coupling such that a mode which initially experiences strong gain may couple into a mode with lower gain, thereby equalizing the gain experienced by different modes over the length of the fiber. The reduction of mode-dependent gain in the multimode fiber favors the many mode operation. K.-P. Ho et al., "Mode Coupling and its Impact on Spatially Multiplexed Systems," in Opt. Fiber Telecommun. VI (2013).

Figure 16:
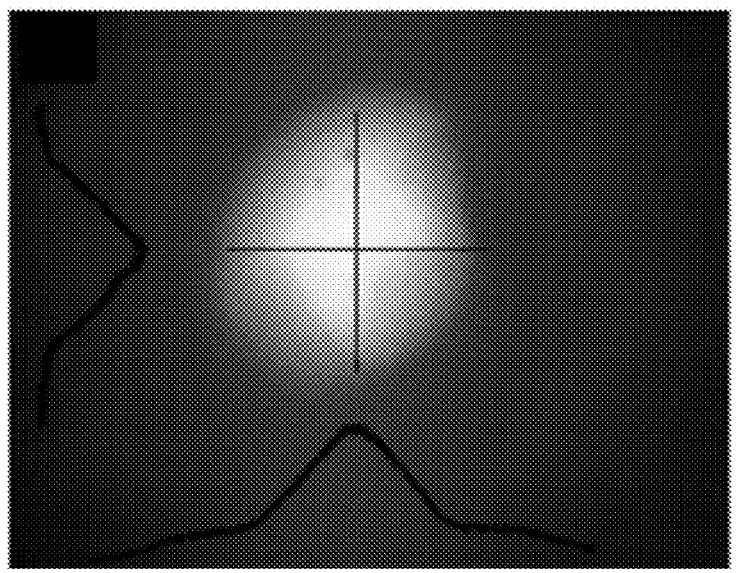
FIG. 16 is a diagram of the spatial profile of the output beam from the fiber ASE source used in the experimental study described herein, measured by a CCD camera placed in the path of the collimated beam, showing a uniform profile with Gaussian cross section and a divergence angle of less than 6°.
Figure 17:
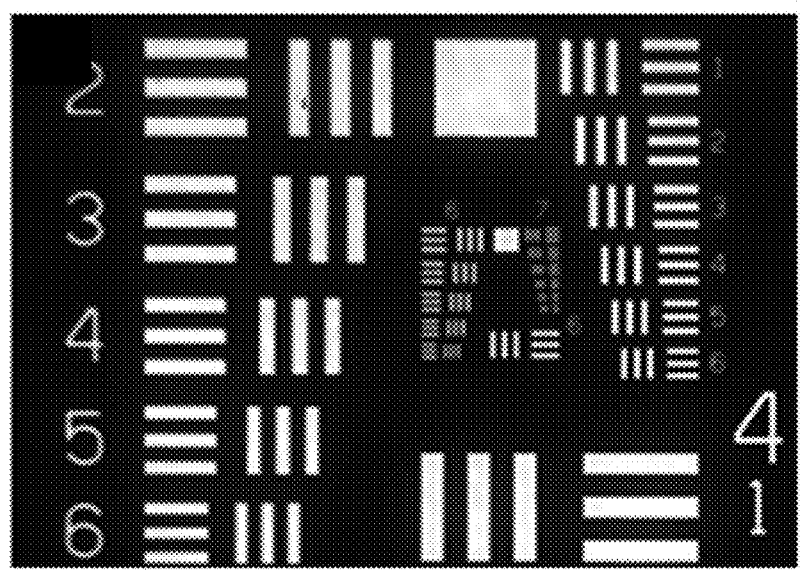
FIG. 17 is an image of a U.S. Air Force resolution chart illuminated in transmission through a static ground glass by the fiber ASE source, which is free of speckle.

In addition to the low spatial coherence, the temporal coherence of the fiber ASE source is also low, which is well suited for ranging applications such as optical coherence tomography (OCT) or frequency-resolved coherent LiDAR. See, e.g., W. C. Swann et al., "Frequency-resolved range/doppler coherent LIDAR with a femtosecond fiber laser," *Optics Letters* 31, 826-828 (2006). For example, the 3 dB bandwidth of 74 nm would provide an axial resolution of 6.6 µm in OCT. In addition to providing both low spatial and low temporal coherence, the fiber ASE source also exhibits high directionality, with a divergence angle of less than 6° (dictated by the NA=0.1 of the fiber). Despite the participation of many spatial modes, the spatial profile of the output beam from the fiber ASE source is smooth and well suited for illumination in imaging applications, as confirmed by the image of the collimated beam in FIG. 16. Finally, the fiber ASE was used as an illumination source to image a U.S. Air Force resolution chart through a static ground glass in transmission mode. A speckle-free full-field image was obtained as shown in FIG. 17.

While the fiber ASE source described in this experimental study provides speckle-free illumination similar to a thermal source or LED, it also produces much higher power per mode, which could enable high-speed imaging or illumination at large distances. As a quantitative comparison, we calculated the photon degeneracy which describes the number of photons per coherence volume. The photon degeneracy parameter $\delta=(P\delta z)/(hvcM)$, where P is the emission power, $\delta z$ is the temporal coherence length, hv is the photon energy, c is the speed of light, and M is the number of spatial modes. L. Mandel and E. Wolf, *Optical Coherence and Quantum Optics* (Cambridge University Press, 1995). Based on the measurements shown in FIG. 15, revealing that the fiber ASE is distributed on average among ~50 spatial modes, we calculated a photon degeneracy of $\delta$~600. This is more than five orders of magnitude higher than the photon degeneracy of a thermal source (e.g. at 4000K temperature, $\delta$~$10^{-3}$), and more than four orders of magnitude higher than that of a bright LED ($\delta$~$10^{-2}$). It is also competitive with recent a demonstration of relatively narrowband, low-spatial-coherence chaotic microcavity laser ($\delta$~100). B. Redding et al., "Low spatial coherence electrically pumped semiconductor laser for speckle-free full-field imaging," *Proc. Natl. Acad. Sci.* 112, 1304-1309 (2015). In addition, the high-power commercial SLD shown to produce speckle of contrast ~0.2 in FIG. 11 exhibits similar degeneracy of $\delta$~600, despite maintaining relatively high spatial coherence and a low number of spatial modes.

In summary, this experimental summary demonstrates a fiber ASE source which combines high power per mode with low spatial and low temporal coherence. The ASE source provides 270 mW of CW emission with 74 nm 3 dB bandwidth centered at $\lambda$=1055 nm. We characterized the spatial coherence and found that the emission is distributed among as many as ~70 spatial modes. A further increase of the number of spatial modes is possible by increasing gain or using a fiber with a larger gain core. The emission exhibits a small divergence angle and uniform spatial profile, making it well-suited as an illumination source in full-field imaging and ranging applications. In the future, we expect the efficiency of the fiber ASE source will be dramatically improved by matching the geometry of the passive multimode fiber to the pump core of the XLMA fiber.

What is claimed is:

1. A source of optical radiation comprising
   an active optical fiber having a first end and a second end, the active optical fiber comprising
      a gain core, the gain core being configured to emit radiation at at least a peak wavelength emitted wavelength when pumped with pump radiation having a pump wavelength, the gain core being doped with a rare earth element, the gain core having a refractive index at the peak emitted wavelength;
      a pump core surrounding the gain core, the pump core having a refractive index at the peak emitted wavelength less than the refractive index of the gain core at the peak emitted wavelength, the pump core being configured to substantially confine radiation of the peak emitted wavelength within the gain core;
      a cladding surrounding the pump core, the cladding having a refractive index at the pump wavelength less than the refractive index of the pump core at the pump wavelength, the cladding being configured to substantially confine radiation of the pump wavelength within the pump core and the gain core
      wherein the value $M=16R^2(NA)^2/\lambda^2$ in which R is the gain core radius, NA is the active optical fiber numerical aperture, and $\lambda$ is the peak emitted wavelength, is at least 50;
   wherein the active optical fiber is not part of resonant cavity; and at least one pump source operatively coupled to the active optical fiber, the at least one pump source being configured to pump the active optical fiber with radiation of the pump wavelength, wherein the source of optical radiation is configured to output radiation of at least the peak emitted wavelength from the second end of the active optical fiber.

2. The source of optical radiation according to claim 1, wherein the gain core of the active optical fiber has a diameter in the range of about 50 μm to about 3000 μm.

3. The source of optical radiation according to claim 1, wherein the gain core of the active optical fiber has a diameter in the range of about 80 μm to about 1200 μm.

4. The source of optical radiation according to claim 1, wherein the pump core of the active optical fiber has a cross-sectional shape that is polygonal.

5. The source of optical radiation according to claim 1, wherein the pump core of the active optical fiber has an average thickness (i.e., radially averaged) in the range of about 15 μm to about 1000 μm.

6. The source of optical radiation according to claim 1, wherein the cladding of the active optical fiber has an average thickness (i.e., radially averaged) in the range of about 15 μm to about 1000 μm.

7. The source of optical radiation according to claim 1, wherein the gain core of the active optical fiber is formed from doped silica glass.

8. The source of optical radiation according to claim 1, wherein the gain core of the active optical fiber is doped with ytterbium.

9. The source of optical radiation according to claim 1, wherein the gain core of the active optical fiber is doped with at least one of ytterbium, erbium, thulium, praseodymium and neodymium.

10. The source of optical radiation according to claim 1, wherein the value $M=16R^2(NA)^2/\lambda^2$ of the active optical fiber, in which R is the gain core radius, NA is the active optical fiber numerical aperture, and $\lambda$ is the peak emitted wavelength, is at least 200.

11. The source of optical radiation according to claim 1, wherein the first end of the active optical fiber, the second end of the active optical fiber, or both have an endface formed at an angle of at least 3° from the normal of the fiber axis.

12. The source of optical radiation according to claim 1, wherein the peak emitted wavelength of the active optical fiber is in the range of 600 nm-2000 nm.

13. The source of optical radiation according to claim 1, wherein the at least one pump source is configured in a co-pumping configuration with respect to the active optical fiber.

14. The source of optical radiation according to claim 1, further comprising at least one optic disposed at the second end of the active optical fiber, the at least one optic being configured to focus, collimate or spread radiation emitted from the second end of the active optical fiber.

15. The source of optical radiation according to claim 1, further comprising a filter operatively disposed at the second end of the active optical fiber, the filter being configured to separate radiation of the pump wavelength from radiation of the peak emitted wavelength.

16. The source of optical radiation according to claim 1, configured to output radiation having a spread in wavelengths at the half-maximum peak emission power of at least about 30 nm in width.

17. The source of optical radiation according to claim 1, configured to output radiation having a power in the range of about 1 mW to about 50 W.

18. The source of optical radiation according to claim 1, configured to output radiation having a speckle contrast that is no more than about 0.07.

19. The source of optical radiation according to claim 1, wherein there is no source of optical radiation having a wavelength within the gain band of the active optical fiber of the optical source operatively coupled to the active optical fiber of the optical source.

20. An optical system for optically probing an object, the optical system comprising:
  a source of optical radiation according to claim 1, the source of optical radiation configured to illuminate the object with radiation of at least one emitted wavelength;
  a detector of optical radiation configured to detect radiation of the at least one emitted wavelength returned from the object.

21. The optical system according to claim 20, configured as a LIDAR system, an optical coherence tomography system, an optical gyroscope, a spectroscope, a chemical or biological sensor, or a motion sensor.

22. A method for providing optical radiation of at least a peak emitted wavelength, the method comprising
  providing the source of optical radiation according to claim 1; and
  pumping the active optical fiber of the source of optical radiation with pump radiation of a pump wavelength from the at least one pump source of the source of optical radiation, the pump radiation being selected to cause the gain core of the active optical fiber to emit the optical radiation of at least the peak emitted wavelength.

23. A method according to claim 22, wherein the pumping is performed without inputting to the active optical fiber a substantial amount of radiation within the gain band of the active optical fiber of the optical source.

24. A method according to claim 22, wherein the optical radiation provided has a speckle contrast that is no more than about 0.07.

25. A method for optically probing an object the method comprising illuminating the object with radiation of at least one emitted wavelength generated according to the method of claim 22, and detecting radiation of the at least one emitted wavelength returned from the object.

26. The source of optical radiation according to claim 1, wherein the value $M=16R^2(NA)^2/\lambda^2$ of the active optical fiber, in which R is the gain core radius, NA is the active optical fiber numerical aperture, and $\lambda$ is the peak emitted wavelength, is at least 100.

* * * * *